United States Patent

[11] 3,557,786

[72] Inventors Courtland H. Barr, Sr.
Los Angeles;
Courtland H. Barr, Jr., La Canada, Calif.;
John W. Barr, Wheeling, Ill.; James W. Lucas, Los Angeles, Calif.
[21] Appl. No. 737,889
[22] Filed June 18, 1968
[45] Patented Jan. 26, 1971
[73] Assignee Abbott Laboratories
North Chicago, Ill.
a corporation of Illinois

[54] ADMINISTRATION APPARATUS FOR INTRAVENOUS SUBSTANCES
3 Claims, 5 Drawing Figs.
[52] U.S. Cl. ................................................. 128/214, 210/94, 210/446
[51] Int. Cl. ........................................................... A61m 5/46
[50] Field of Search .......................................... 128/214, 214.2; 210/94, 446

[56] References Cited
UNITED STATES PATENTS

| | | | |
|---|---|---|---|
| 2,901,112 | 8/1959 | Naftulin et al. | 210/94 |
| 2,914,181 | 11/1959 | Naftulin et al. | 210/446 |
| 3,004,536 | 5/1962 | Walter | 128/214 |
| 3,217,889 | 11/1965 | Berg | 210/448 |
| 3,390,677 | 7/1968 | Razimbaud | 128/214 |

Primary Examiner—Dalton L. Truluck
Attorney—Robert L. Niblack

ABSTRACT: An improved drip chamber having a filter positioned around the outlet for use in intravenous liquid administration apparatus. The filter is comprised of a woven sheet of plastic monofilament, such as nylon, and is folded intermediately thereof to form filter leaves. The folder filter sheet is positioned over the drip meter outlet, between the drip chamber walls and heat sealed thereto.

PATENTED JAN 26 1971    3,557,786
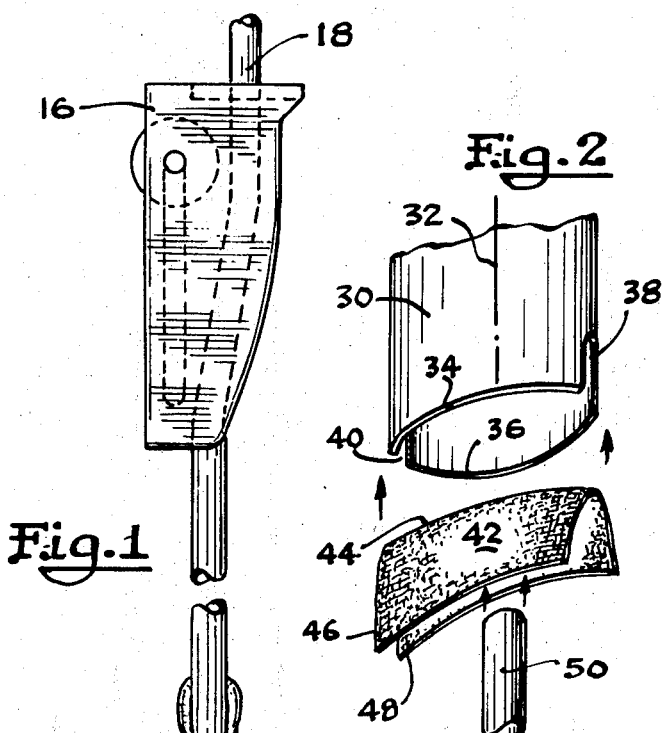
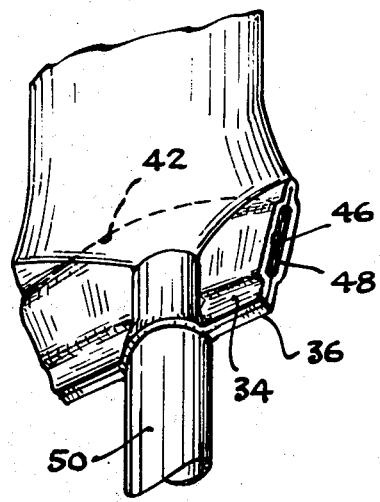
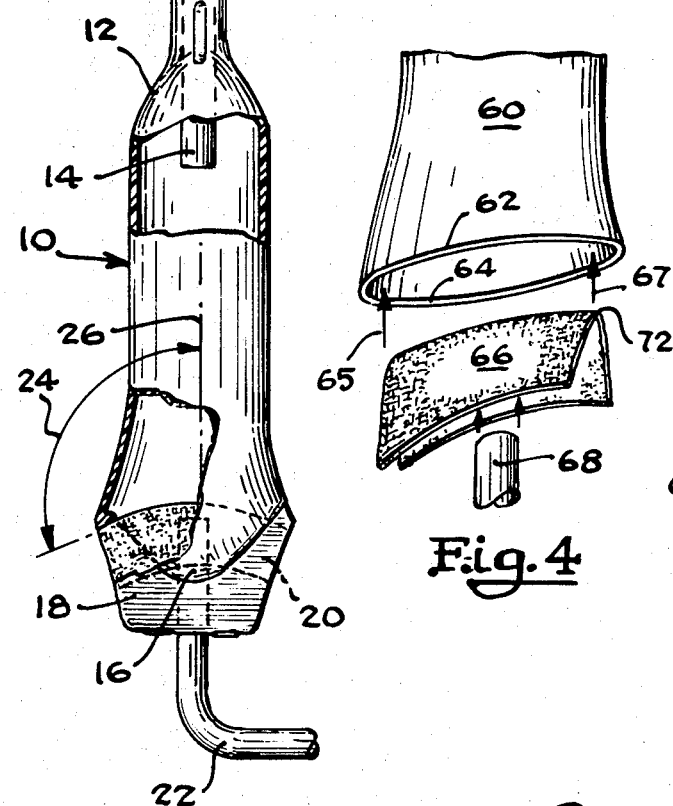
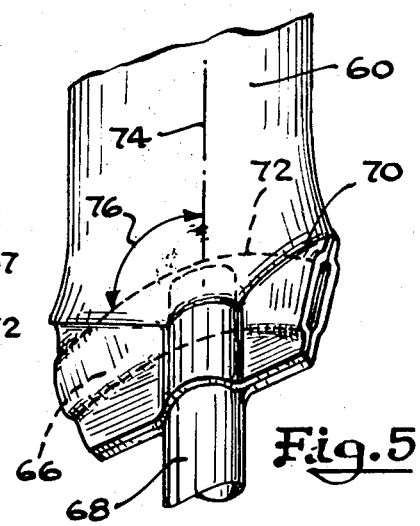
Inventors
By
Attorney

ADMINISTRATION APPARATUS FOR INTRAVENOUS SUBSTANCES

BACKGROUND OF THE INVENTION

The field of the present invention relates to administration apparatus for intravenous liquids.

There are available many kinds of intravenous drip chambers having an integral filter. In most of these drip chambers the filter element is preformed and positioned to remove particulate material from the intravenous liquids prior to injection. In integral filter assemblies which have been known heretofore, a considerable amount of preforming and/or fabrication was performed on the filter material, such as the forming of it into a baglike structure, prior to assembly with the filter housing. When numerous seams were present, the filters tended to be unreliable in performance. The multiplicity of manufacturing steps resulted in high unit costs so reuse of the filter was indicated. There remains, therefore, a need for a reliable filter, so simple to construct and inexpensive to manufacture that the intravenous administration apparatus of which it is a part can be disposed of after a single use.

It is an object of this invention, therefore, to provide a drip chamber having an integral filter for use in intravenous administration apparatus.

It is a further object of this invention to provide a filter which is reliable in operation yet simple and economical to manufacture. It is a still further object of this invention to provide a filter which requires a minimum of preforming prior to assembly in a completed drip chamber. It is a still further object of this invention to provide a method of manufacturing a filter and a drip chamber.

These and other objects and advantages of the invention will appear from the description which follows and from the drawings.

In general, the objects of this invention are achieved by the provision of a combination drip chamber and integral filter for use in intravenous administration apparatus, said chamber having a flexible, transparent plastic tubular body with at least one opening in each end thereof. The body has a filter at one end which is homogeneous in the filter area and is sealed to said plastic tubular body and positioned to filter all fluids passing through said tubular body. The filter may be fabricated by a process which comprises the steps of cutting a length of transparent flexible plastic tubing corresponding to the length of the drip chamber to provide a chamber body and having opposed walls on the end of the body to receive the filter, interposing a piece of folded filter cloth between said walls, inserting into said fold an outlet conduit having a diameter smaller than the diameter of the body, and securing said cloth and said conduit to the chamber body to provide an integral assembly.

The various aspects of the invention can be better understood by reference to the drawings wherein:

FIG. 1 is a view of an administration apparatus including the drip chamber of the present invention partly broken away for purposes of illustration;

FIG. 2 is an expanded view of one embodiment of the invention with the parts positioned for assembly by movement in the direction indicated by the arrows;

FIG. 3 illustrates a filter in position on a completed end of the drip chamber;

FIG. 4 is an expanded view of another embodiment of the invention, again with the parts positioned for assembly by movement in the direction of the arrows; and FIG. 5 is a view of the completed filter of this embodiment in position on the end of the drip chamber.

Referring now to the drawings in greater detail, there is shown in FIG. 1 a drip chamber generally 10 having an inlet end 12 containing a drop forming element 14. At the outlet end 16 opposed walls 18 are flattened and have sealed between them a filter 20 and an outlet conduit 22. The filter is a folded sheet and the terminus of the outlet conduit lies within the fold. In the preferred embodiment the drip chamber body is of a transparent flexible plastic material such as polyvinyl chloride and the like and the filter sheet is woven from monofilament nylon although other materials and thread types are suitable. In the preferred embodiment the folded filter sheet does not extend transverse of the body in a straight line but, as shown in FIG. 1, forms an obtuse angle 24 with the longitudinal axis 26 of the drip chamber.

The method of manufacture of one embodiment of the filter can be better understood by reference to FIG. 2 wherein the various elements are shown as they might appear prior to assembly. Illustrated is the outlet end of the chamber body 30 having a longitudinal axis 32 and opposed walls 34 and 36. Slits 38 and 40 are A filter in the body parallel to the axis 32. A filter sheet 42 of monofilament nylon cloth is creased to form a fold 44 and filter leaves 46 and 48. For assembly, portions of the leaves are located within the slits 38 and 40, and outlet conduit 50 is placed between the leaves and also between the opposed walls 34 and 36. The assembly is then clamped between a pair of heated jaws (not shown) to seal the walls, filter and outlet conduit in to a fluid-tight unit. FIG. 3 illustrates the filter in place after the sealing operation, with the ends of the filter leaves 46 and 48 extending between the walls 34 and 36.

In manufacturing the embodiment of FIG. 2, the margins of the filter sheet 42 may, during assembly, extend beyond the sides of the chamber body so that the filter may be formed from a longitudinally creased ribbon of material and a plurality of chamber bodies may be located side by side along the length of the ribbon for convenient production operations.

A modified method of manufacturing the filter is shown in FIG. 4 wherein the outlet of the chamber body 60 is flattened so that the opposed walls 62 and 64 are extended sufficiently to receive the filter sheet 66. An outlet conduit 68 is inserted between the leaves of the filter which is, as indicated by the arrows 65 and 67, interposed between the walls 62 and 64 and sealed into a fluid-tight closure by heat pressure. The finished assembly is shown in FIG. 5.

As illustrated in FIG. 5, the outlet conduit 68 may extend into the drip chamber body 60 beyond the margin 70 of the sealed portion and may be located adjacent the fold 72 in the filter sheet. In this position, the conduit 68 supports the filter sheet within the chamber body.

In a preferred arrangement of the filter in the sealed area, the fold does not extend linearly transverse the axis 74 of the chamber body but forms an obtuse angle 76 on either side thereof which facilitates the development of a fluid-tight seal.

It will be apparent to those skilled in the art that in the method of assembly illustrated in FIG. 4 the filter sheet 66 may be a segment of a ribbon of filter cloth which extends generally parallel with the outlet conduit and is severed during the sealing operation.

The formation of the inlet end of the chamber body is accomplished simply by inserting the drop forming element between the body walls and sealing it therein by methods known to the art.

Many variations are possible within the scope of the present invention. For example, it is not necessary to heat seal plastic around the outlet conduit and the filter sheet but the assembly may be rendered fluid-tight by the use of adhesives. In certain cases, the application of pressure alone will be sufficient.

The actual utilization of the administration apparatus of this invention is not described here in detail since those skilled in the art are already familiar with the use of other devices in the administration of saline, sucrose and other intravenous solutions. The operation of the device for administering these solutions is the same as with known administration sets.

Having fully described the invention, it is intended that it shall be limited only by the lawful scope of the appended claims.

We claim:

1. In an intravenous administration apparatus, an improved drip chamber comprising a flexible, transparent chamber body of substantially rounded center cross section, said chamber body having an inlet end and an outlet end, a drop former disposed within said inlet end of said chamber body, said outlet end having a pair of opposed sidewalls and extending substantially parallel to the longitudinal axis of said chamber body, a filter sheet being creased and having a fold and filter leaves, said filter sheet being positioned between said pair of opposed sidewalls so as to be disposed along the horizontal axis of said drip chamber, said filter being sealed to and through to said walls in a fluid-tight closure, an outlet conduit of lesser diameter than said chamber sealed between said walls and said filter leaves at the outlet end of said chamber, said filter sheet disposed between said outlet conduit and said drop former to form a continuous filter envelope.

2. In an intravenous administration apparatus in accord with claim 1, the opposed sidewalls of said drip chamber having slits therein, said slits being parallel to the longitudinal axis of the drip chamber body and adapted to receive said filter sheet, said filter sheet being disposed within said slits so that said fold is adjacent the inlet end and the leaves are adjacent the outlet end of said chamber body.

3. In an intravenous administration apparatus in accord with claim 2, said filter being a woven monofilament nylon filter.